Figure 2B:
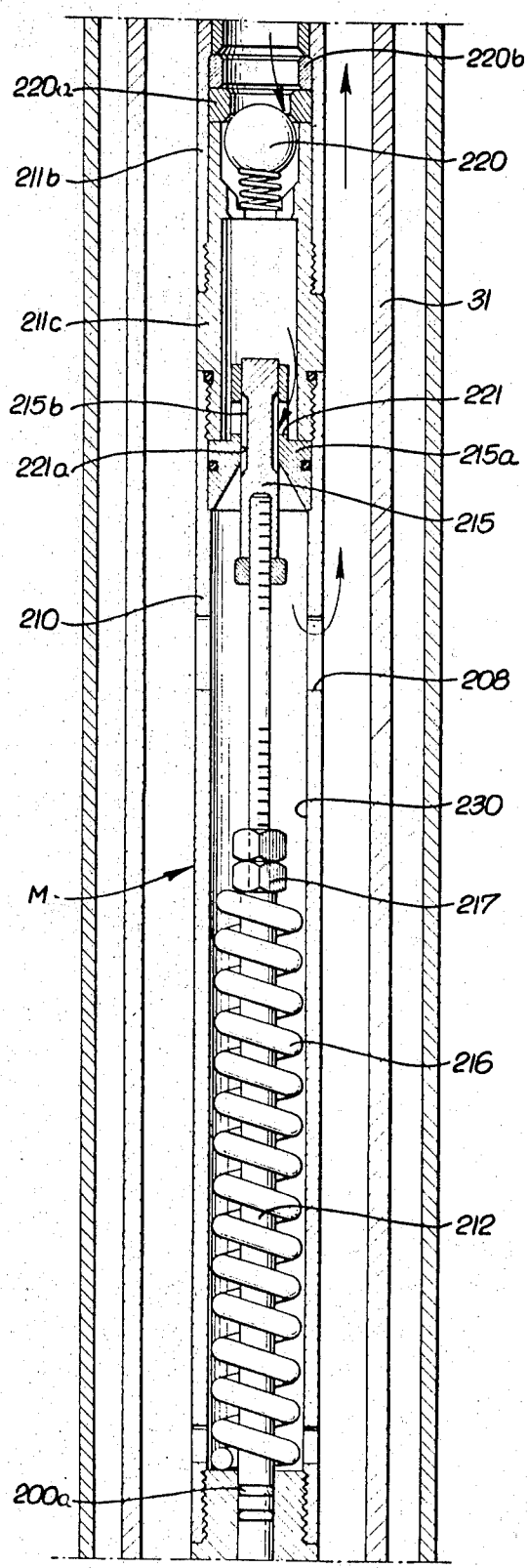

United States Patent

[11] 3,561,473

[72] Inventor David V. Chenoweth
Houston, Tex.
[21] Appl. No. 757,688
[22] Filed Sept. 5, 1968
Division of Ser. No. 653,372, Pat. No. 3,474,859.
[45] Patented Feb. 9, 1971
[73] Assignee Baker Oil Tools, Inc.
City of Commerce, Calif.
a corporation of California

[54] VALVE SEAL APPARATUS
3 Claims, 4 Drawing Figs.

[52] U.S. Cl. ................................................. 137/542
[51] Int. Cl. ................................................. F16k 39/02
[50] Field of Search ........................................... 137/542,
155; 251/57; 116/115, 224; 277/(Inquired), 135

[56] References Cited
UNITED STATES PATENTS
2,685,886 8/1954 Peters ........................... 137/155

| 2,761,465 | 9/1956 | Garrett ........................... | 137/155 |
| 2,894,793 | 7/1959 | Robinson ......................... | 277/135 |
| 2,908,290 | 10/1959 | Hamilton-Peters ............. | 251/57 |

Primary Examiner—William F. O'Dea
Assistant Examiner—William H. Wright
Attorney—Bernard Kriegel ABSTRACT: A valve or regulator apparatus for fluid flow, in which a pressure differential shifts the valve to different positions, one portion of the valve being subject to low pressure, such as pressure in an atmospheric chamber, and the other portion of the valve being subject to relatively high pressures. A valve stem, or the like, is exposed to the atmospheric pressure in the chamber and makes a sealing fit in a guide. A seal chamber is provided containing a liquid, such as silicone oil, which is prevented from entering the atmospheric chamber by the seal between the valve stem and the guide, the silicone oil preventing the fluids under pressure, which flow through the valve, from contacting and acting upon the seal adjacent the atmospheric chamber.

PATENTED FEB 9 1971
3,561,473
SHEET 1 OF 2
Fig. 2a.
Fig. 1.
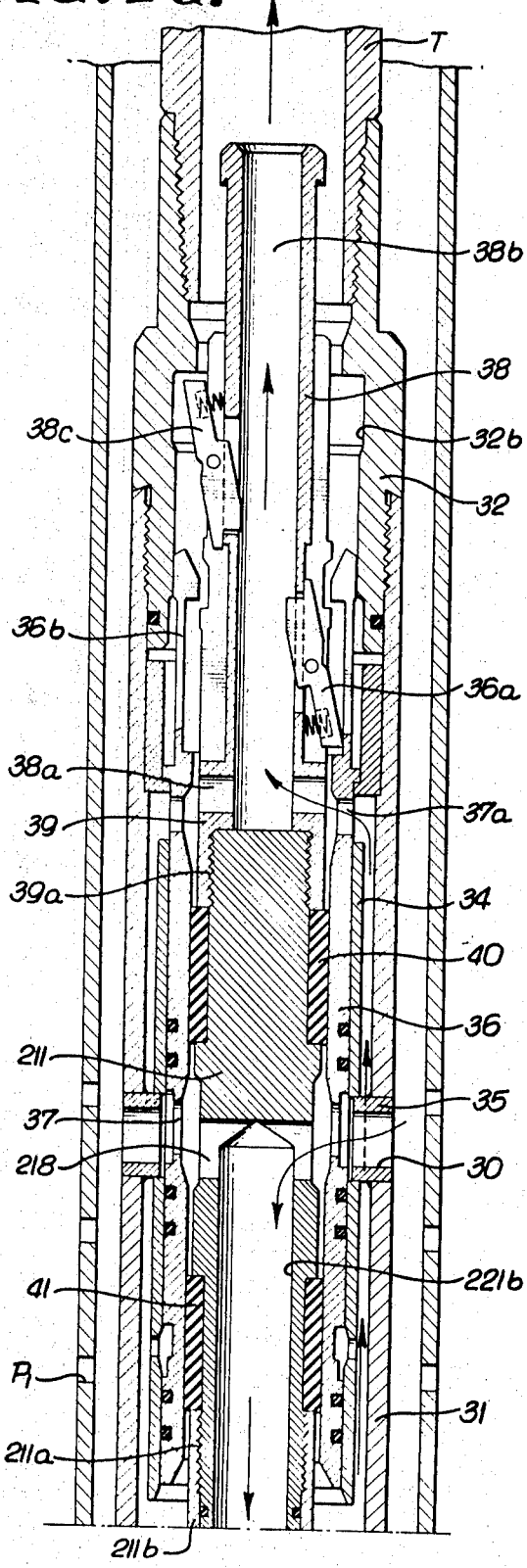
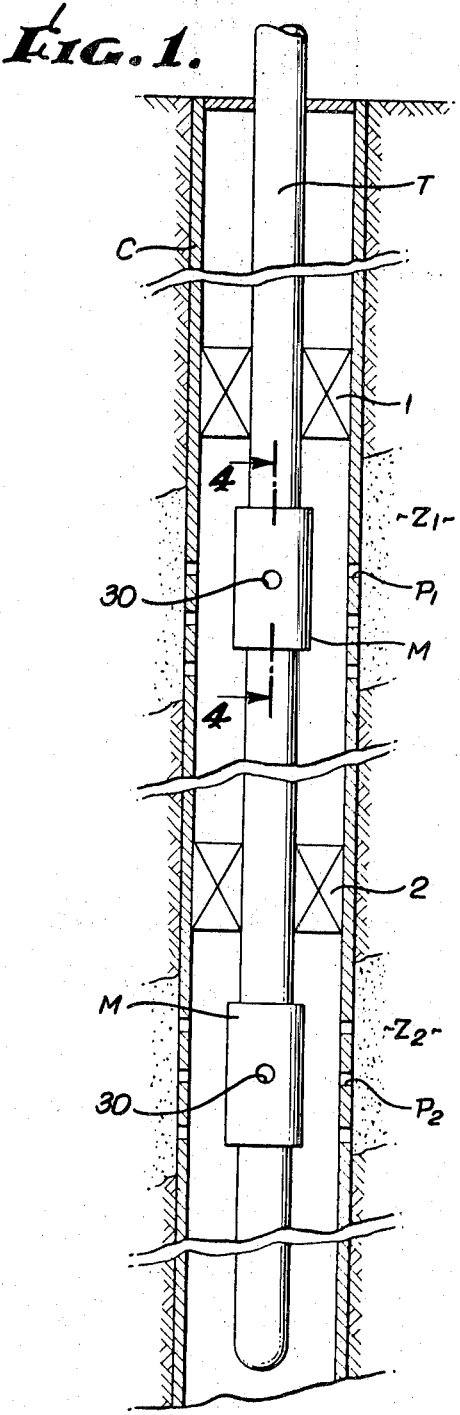
INVENTOR.
DAVID V. CHENOWETH
By Bernard Kriegel
ATTORNEY.

INVENTOR.
DAVID V. CHENOWETH
By Bernard Kriegel
ATTORNEY.

VALVE SEAL APPARATUS

This application is a division of my application for "Well Flow Control Apparatus," Ser. No. 653,372, now U.S. Pat. No. 3,474,859 filed Jul. 14, 1967.

The present invention relates to valve or flow regulator apparatus, and more particularly to seal devices for preventing undesired gas and liquid leakage past certain portions of the apparatus.

Valve or flow regulator apparatus are known in which it is desirable to prevent fluids from moving past the apparatus into a low pressure chamber, such as a closed atmospheric chamber. Heretofore, reliance has been placed upon mechanical seals for preventing such flow of liquids and gases into the atmospheric or corresponding chamber. However, it has been found that gas leaks through seal imperfections, both metallic and elastomeric, into the chamber, thereby causing an increase in the pressure in the chamber and inappropriate operation of the valve apparatus, if not eventually causing its failure to operate at all. Atmospheric chambers have been sealed heretofore through the use of bellows. However, such bellows cannot stand the high pressure differentials, such as are encountered in subsurface oil well tools.

By virtue of the present invention, the aforenoted difficulties are overcome. A valve or flow regulator apparatus is provided in which gas and other fluid are prevented from leaking into an atmospheric or other low pressure chambers. A separate seal chamber is provided in which a liquid is confined that will prevent the gas or other fluid from migrating to the atmospheric chamber. This liquid is retained in its seal chamber by suitable seal rings, for example, of the elastomer type, these seal rings being effective in preventing leakage of liquids thereby, but sometimes permitting leakage of gas thereby. The liquid seal, such as silicone oil, has very little capacity for absorbing gas, but will still prevent gas from moving through it. Thus, the silicone or other will still prevent gas from moving to the region of the elastomer seal, while the elastomer seal will prevent silicone oil or other liquid from moving past it into the atmospheric chamber. Accordingly, the combination of the elastomer seal and the body of sealing liquid, such as silicone oil, effectively prevent passage of all liquids and gases into the atmospheric chamber. A sliding seal can be provided between the vale or regulator body and a valve stem, or the like, that projects into or is exposed to the pressure in the atmospheric chamber, permitting the valve or regulator parts to have a large range of movement. Despite the imposition of comparatively high pressures on the movable valve parts, gas and liquid migration past the combination of silicone oil seal and elastomer seal is precluded.

This invention possesses many other advantages, and has other purposes which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Figure 2C:
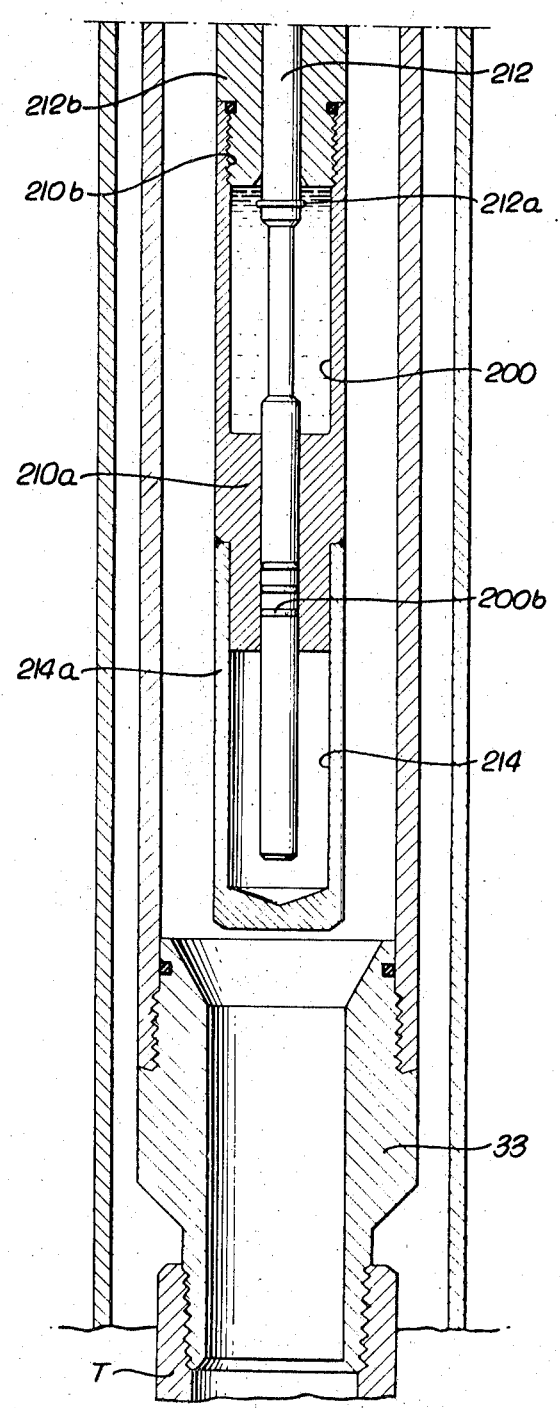

Referring to the drawings:

FIG. 1 is a diagrammatic view illustrating an apparatus disposed in a well bore, and embodying one or more flow regulator mechanisms that incorporate the invention therein;

FIGS. 2a, 2b and 2c constitute a longitudinal section through a flow regulator mechanism for controlling the rate of flow from one of the production zones disclosed in FIG. 1 into a tubing string, FIGS. 2b and 2c constituting lower extensions of FIGS. 2a and 2b, respectively.

Referring to FIG. 1, the present invention is illustrated in connection with a concentric tubing-casing installation, wherein the tubing T is concentrically disposed within the casing C and extends through the well zones Z1 and Z2, the casing also being perforated at P1 and P2 to allow well production fluid to flow from the zone Z1 into the annular space between the tubing and casing and between the well packers 1 and 2; while production fluid from zone Z2 will flow through the perforations P2 into the casing C below the well packer 2, these packers, as is well known, forming a seal with the tubing T and isolating the zones from one another.

The fluid will pass into mass flow control apparatus M in the respective isolated regions of the casing through inlet ports 30, and, in a manner which will now be described, such fluid will pass upwardly into the tubing string T, the fluid from the respective zones being comingled in the tubing.

FIGS. 2a to 2c show in detail a representative mass flow apparatus in the concentric tubing-casing installation, such as that generally illustrated in FIG. 1. As seen in FIGS. 2to 2c, the assembly comprises a housing composed of an elongate body 31 having an upper sub 32 threadedly connected to the tubing T at its upper end. At the lower end of the body 31 is a bottom sub 33 connected to a downward extension of the production tubing T, and which will be understood to extend downwardly through the packer 2 shown in FIG. 1 for connection to a similar assembly for controlling the production from the lower zone Z2.

Interiorly of the housing 31 is a fixed sleeve 34 secured in spaced relation to the housing by a plurality of nipples 35 providing the fluid inlets 30 from the well casing, these nipples being welded, or otherwise secured, to the housing 31 and to the sleeve 34. If desired, a sleeve valve 36 may be provided for selectively opening and closing the ports 30, this sleeve valve being reciprocably disposed within the fixed sleeve 34 and having valve ports 37 adapted, when the sleeve valve 36 is in a lower position, to register with the ports 30 in nipples 35. The sleeve 36 has an upper set of ports 37a adapted to be disposed above the the upper end of the fixed sleeve 34 when the sleeve 36 is in said upper position. This sleeve valve structure is optional, forms no part of the present invention, and is more particularly shown and described in application Ser. No. 488,943, filed Sept. 21, 1965, now U.S. Pat. No. 3,371,717, granted Mar. 5, 1968. In the illustrative embodiment, however, the sleeve valve forms a part of the running and recovery assembly, including a recovery head having a body 38 adapted to be engaged by a suitable wireline running and recovery tool, as more particularly disclosed in the aforementioned application. The recovery head body 38 has lateral ports 38a communicating with ports 37a in the valve sleeve 36 when the latter is in the lower position, as shown in FIG. 2a. These ports 38a lead into an axially extended passage 38b in the head which opens into the production tubing or conduit T. The running and recovery head also includes suitable latch mechanism 38c for holding the assembly, including the mass flow apparatus M hereinafter described, within the housing 31.

Vale sleeve 36 is adapted to be shifted by latch elements 36a to its lower position with the ports 38a communicating with the inlets 30, and when the valve is moved to an upper position, springlike latch elements 36b are adapted to engage in an enlarged bore or groove 32b in the upper sub 32 to hold the valve sleeve 36 in an upper position (not shown) at which the inlets 30 will be closed.

Also included in the recovery head is a lower body portion 39 which supports, by a threaded connection 39a, the body 211 of the upstream pressure regulator. This body includes an upper section threadedly connected to the body of the running and recovery head and extended downwardly in sealed relation to the valve sleeve 36, there being sealing means or packings 40, 41 211 and in sealing engagement with the inside of the valve sleeve 36. Between these packings 40, 41, the body 211 of the upstream pressure regulator is provided with the inlet ports 218. The body section 211 is threadedly connected at 211a to a downwardly extended section 211b, to the lower end of which a coupling 211c is threadedly connected. In the coupling 211c is a backflow preventing ball valve 220 engageable with a seat 220a held in place by a ring 2220b which engages the lower end of the body section 211.

It will be noted that the body sections 211 and 211b, together with the coupling 211c, constitute an axially extended portion of the pressure regulator body 210, to which the coupling 211c is threadedly connected, as seen in FIG. 2b. At the lower end of the body 210 is an end piece 210a threadedly connected and sealed in relation to the body 210 at 210b, as shown in FIGS. 2c, the end piece having a chamber 214 therein provided in an end cap 214a which is suitably welded to, or otherwise formed as, a part of the end piece 210a.

Reciprocably disposed within the body 210 is a stem 212 having thereon adjustable nuts 217 forming an upper abutment for a coil spring 216. At its lower end, as seen in FIG. 2c, the stem 212 extends in sealed relation into the chamber 214 and is limited in respect of its upward movement by a snap ring 212a mounted thereon and engageable with the lower end of a guide 212b to which the end piece 210a is attached, the stem 212 extending through the guide into the chamber 230 within the body 210. It will be noted that the stem 212, as seen in FIG. 2c, extends through a chamber 200 which contains a quantity of lubricant, such as silicone oil, whereby the stem section extending through the body sections 212b, 210a will be lubricated to reduce friction effects. The lubricant is confined by suitable sealing means at 200a between the stem and body, and by the sealing means 200b which seals the lower end of the stem 212 in the atmospheric chamber 214.

The upper extremity of the stem 212 is provided with a throttle valve member 215 which is slidably disposed within a valve guide 215a, the latter having inlet ports 221 leading to a bore 221a through the guide 215a. The throttle valve member 215 has a reduced section 215b which, when the valve is in the open position, as shown in FIG. 2b, permits controlled flow through the passage 221a of the vale guide 215a.

The throttle valve end 215 of the stem 212 will assume a position at which flow through inlet 221, 221a is controlled as a function of the pressure acting on the cross-sectional area of the valve member 215 to provide a force counteracted by the force of the spring 216, the remainder of the stem being pressure balanced.

In the illustrative embodiment of FIGS. 2a to 2c, assuming the ports 30 and 37 to be open, as shown in FIG. 2a, production fluid from the well zone in which the apparatus is disposed may pass through these ports and flow downwardly through a central passageway 221b in the regulator body section 211 past the check valve 220. The fluid will then proceed downwardly through the inlet ports 221 in the valve guide 215a, and through passage 221a into the chamber 230, from whence it may flow through ports 208 into the annular space defined between the housing 31 and the flow regulating apparatus M, as shown in FIG. 2b. Then, as shown in FIG. 2a the fluid will continue to pass upwardly through the ports 37a in the valve sleeve 36 and through the ports 38a in the recovery head body 38 so as to flow upwardly through the passage 38b in the latter. The rate at which the production fluid may flow through the throttle valve guide 215a will be determined by the force supplied by spring 216 tending to close off the flow and acting against the force provided by the pressure of the production fluid acting on the cross-sectional area of the throttle valve member 215, so that there will be maintained a constant back pressure on the formation and, therefore, a constant mass rate of production fluid flow into the tubing T. The constant pressure on the formation will be maintained notwithstanding the use of auxiliary lift equipment in the tubing T above the mass rate flow control means, such as gas lift apparatus or the usual pumping apparatus, all well known in the art.

As noted above, a lubricant, such as silicone oil, is disposed in the seal chamber 200, which will have the effect of reducing friction effects to enable the free sliding of the stem 212 within the body 210 of the pressure regulator. The body of silicone oil also serves the important purpose of protecting the atmospheric chamber 214. The O-ring seal members, such as seal rings 200a and 200b, will prevent leakage thereby of a viscous liquid, but such O-rings are permeable to gas. Thus, the O-rings 200b will prevent the silicone oil in the chamber 200 from flowing downwardly into the atmospheric chamber 214, but, by themselves, they are permeable to gas and might, if used alone, permit gas in the well bore from leaking downwardly past the seal rings 200b and into the atmospheric chamber 214. Such leakage of as will allow pressure to build up in the atmospheric chamber 214, and could render the pressure regulator apparatus inoperable to function with the desired degree of effectiveness.

The silicone oil in the seal chamber 200 acts as a seal to prevent any gas that might leak past the seal rings 200a from passing along the lower portion of the stem beyond the seal rings 200b and into the chamber 214. Silicone oil has a low gas solubility and, in addition, will retain its viscosity at a desirable value, since its viscosity changes only a small degree with rather large temperature changes. The silicone oil, in combination with the seal rings, acts an an effective barrier, preventing gas migration into the atmospheric chamber 214. The seal rings 200b are effective to prevent migration of the silicone into the chamber 214, and the silicone body in the chamber 200 prevents migration of gas thereby and to the region of the seal rings 200b.

It has been found that, in the absence of the lubricant seal in the chamber 200, gas will pass through seal rings and past the metallic surfaces between the stem 212 into the atmospheric chamber 214. The provision of the liquid barrier in the chamber 200 is found to prevent gas leakage into the chamber 214. Thus, through the provision of the liquid barrier, applicant provides an apparatus that can function effectively under very high pressure differentials between the pressure acting on the valve stem 212 and the relatively small pressure in the atmospheric chamber 214. The use of bellows has been proposed heretofore this purpose, but such bellows cannot withstand very high differential pressures of the order required in subsurface tools, and particularly where a substantial range of movement of the valve or regulator portions of the mechanism is required.

I claim:

1. In flow control apparatus: body means having an inlet passage, an outlet passage, and a low pressure chamber; valve means in said body means for controlling fluid flow between said passages, said valve means including a fluid pressure responsive member shiftable in said body means and having a first surface exposed to the pressure in said low pressure chamber and a second surface exposed to the fluid pressure in one of said passages; said body means having a seal chamber through which said fluid pressure responsive means extends; means providing a slidable elastomer seal between said member and body means at one side of said seal chamber between said chambers; means providing a slidable elastomer seal between said member and body means at the opposite side of said seal chamber; a liquid in said seal chamber surrounding and contacting said member and contactable with said slidable elastomer seals, said liquid having low gas solubility; said first surface being on one side of said seal chamber and elastomer seals and said second surface being on the opposite side of said seal chamber and elastomer seals; said low pressure chamber containing a gaseous medium at substantially atmospheric pressure.

2. In flow control apparatus as defined in claim 1; wherein said liquid is a lubricant having small viscosity change characteristics when subjected to large temperature changes.

3. In flow control apparatus as defined in claim 1, wherein said liquid is a silicone oil.